United States Patent [19]

Mevissen

[11] Patent Number: 5,250,085
[45] Date of Patent: Oct. 5, 1993

[54] FLEXIBLE BONDED ABRASIVE ARTICLES, METHODS OF PRODUCTION AND USE

[75] Inventor: Scott M. Mevissen, White Bear Lake, Minn.

[73] Assignee: Minnesota Mining and Manufacturing Company, St. Paul, Minn.

[21] Appl. No.: 4,947

[22] Filed: Jan. 15, 1993

[51] Int. Cl.⁵ .................................................. C09K 3/14
[52] U.S. Cl. ......................................... 51/298; 51/293; 51/295; 51/308
[58] Field of Search ................... 51/293, 295, 298, 308

[56] References Cited

U.S. PATENT DOCUMENTS

| | | | |
|---|---|---|---|
| 2,878,111 | 3/1959 | Daniels et al. | 51/298 |
| 2,972,527 | 2/1961 | Upton, Jr. | 51/298 |
| 3,041,156 | 6/1962 | Rowse et al. | 51/298 |
| 3,098,370 | 7/1963 | Rowse | 51/298 |
| 3,423,195 | 1/1969 | Steinberg | 51/295 |
| 3,850,589 | 11/1974 | Charvat | 51/295 |
| 3,982,359 | 9/1976 | Elbel et al. | 51/295 |
| 4,011,063 | 3/1977 | Johnston | 51/295 |
| 4,049,396 | 9/1977 | Shaffer | 431/95 |
| 4,221,572 | 9/1980 | Torimae et al. | 51/298 |
| 4,264,337 | 4/1981 | Fenster et al. | 51/295 |
| 4,459,779 | 1/1984 | Shen | 51/296 |
| 4,504,283 | 3/1985 | Charvat | 51/298 |
| 4,581,287 | 4/1986 | Smith et al. | 428/290 |
| 4,773,920 | 9/1988 | Chasman et al. | 51/295 |
| 4,802,896 | 2/1989 | Law et al. | 51/298 |
| 4,871,376 | 10/1989 | DeWald | 51/298 |
| 4,933,373 | 6/1990 | Moren | 521/99 |
| 4,945,687 | 8/1990 | Scheider et al. | 51/298 |

FOREIGN PATENT DOCUMENTS 1245373 9/1971 United Kingdom .
1334920 10/1973 United Kingdom .

OTHER PUBLICATIONS

"Silane Coupling Agent Chemistry" and Selecting a Silane Coupling Agent, *Silicon Compounds Register and Review*, Petrarch Systems, Inc., Bristol Pa. (1984).
Trade-literature from Dow Corning: "Beneficial Effects of Silane Coupling Agent".

Primary Examiner—Mark L. Bell
Assistant Examiner—Willie J. Thompson
Attorney, Agent, or Firm—Gary L. Griswold; Walter N. Kirn; Jeffrey L. Wendt

[57] ABSTRACT

Bonded abrasive articles and methods of making and using same are presented, the bonded abrasive articles comprising abrasive particles dispersed throughout and adhered within an elastomeric polyurethane binder, at least a portion of the abrasive particles adhered to the polyurethane binder by a silane coupling agent. The silane coupling agent is preferably coated onto the abrasive particles before they are mixed with the uncured polyurethane resin. The articles of the invention exhibit excellent smear- and wear-resistance and provide improved abrasion efficiency.

15 Claims, No Drawings

FLEXIBLE BONDED ABRASIVE ARTICLES, METHODS OF PRODUCTION AND USE

BACKGROUND OF THE INVENTION

1. Field of the Invention

The present invention relates to bonded abrasive articles comprising silane coupling agent treated abrasive particles dispersed throughout and adhered within polyurethane binders.

2. Description of Related Art

Abrasive products formed of a solid or foamed organic polymeric matrix having abrasive granules dispersed throughout and bonded therein are widely used and are known as "bonded" or "molded" abrasives. Typically, the polymeric matrix is composed of either a hard thermoset resin, such as base-catalyzed phenol formaldehyde, or a resilient elastomeric resin, such as a polyurethane or a compounded rubber composition.

The hard thermosetting resins generally have a high tensile strength and a low elongation at failure, and produce bonded abrasive products which are resistant to significant change when subject to elevated temperatures. However, these hard thermoset resin bonded abrasive products are susceptible to brittle fracture and have the disadvantage of leaving "chatter" marks on the workpiece, particularly when used in off-hand operations.

The elastomeric resins generally produce an abrasive product having some degree of flexibility and resiliency. Typically, these articles provide a smoother abrasive action and a finer surface finish than a hard thermoset resin bonded article. Because of this, flexible elastomeric resin bonded abrasive articles have found a broad range of industrial applications such as in the metal-working and wood-working industries for deburring, finishing and sanding. Unfortunately, however, these elastomeric resin bonded articles often show significant softening at elevated temperatures as might be encountered when an abrasive product is urged against a workpiece at high surface speeds and/or high pressures. Such softening often results in the premature loss of abrasive particles, the undesirable smearing or transfer of portions of the abrasive article to the surface of the workpiece in the case of metal-working applications, or the glazing over of the article's surface in the case of wood-working applications.

Conventional elastomeric resin bonded abrasive articles typically use an elastomeric polyurethane as the binder matrix. The polyurethane binder matrix may be a foam or a solid. Furthermore, the polyurethane binder matrix may be formed of a linear or crosslinked polymer network.

Attempts to form a resilient yet smear-resistant polyurethane binder by introducing a moderate amount of crosslinking into the polyurethane network with standard crosslinking techniques using polyfunctional isocyanates and polyfunctional polyols have yielded marketable bonded abrasives. However, perhaps due to the extended distances between crosslinks, the amount of crosslinking necessary to provide smear-resistance by these standard crosslinking techniques typically makes the resin hard and brittle, and thus the articles do not have optimum cutting ability.

While the most common application for silane coupling agents is to bond an inorganic substrate to a polymer, the prediction of which silane coupling agent is best for a given inorganic/polymer system is extremely difficult. In the case of abrasive articles, coupling agents which demonstrate improvement in the qualities of increased cut, decreased wear, increased smear-resistance, and resistance to loss of abrasive grains under end-use conditions are most important. The abrasives industry is constantly seeking improved flexible molded abrasive articles that will not smear or glaze when used at high surface speeds and/or high operating pressures and have increased cut with decreased (or no significant increase) in wear.

SUMMARY OF THE INVENTION

The present invention provides shatter-resistant, smear-resistant, glaze-resistant, flexible, resilient polyurethane resin bonded abrasive articles which are more efficient in abrading wooden and metallic workpieces than previously known polyurethane resin bonded abrasive articles. The articles of the invention conform to the surface of the workpiece during use so as to produce a finish essentially free of chatter marks, even when used in off-hand operations. In particular, the inventor herein has discovered that when using the particular polyurethane resins and silane coupling agent combinations disclosed herein, material abraded or worn away ("cut") is increased with no significant increase in wear of the abrading article.

As used herein the term "efficiency" means the ratio of the weight of workpiece removed, or "cut", divided by the weight of abrasive article worn away, or "wear". "Smearing" refers to the undesirable transfer of portions of the abrasive article to the workpiece in the case of metal-working applications, while "glazing" refers to the glazing over of the abrasive article surface in the case of wood-working applications.

The bonded abrasive article of the invention comprises abrasive particles dispersed and adhered within a cured polyurethane resin. The term "polyurethane", as used herein, is intended to include true polyurethanes, true polyureas, polyurea urethanes, and polyurethane ureas. At least a portion of the abrasive particles are adhered within the cured polyurethane resin by a silane coupling agent. The silane coupling agent may either be coated onto the abrasive particles prior to their introduction into the resin, or simply added to the uncured polyurethane resin mixture as another ingredient. It is preferred that the abrasive particles are coated with the silane coupling agent prior to their introduction into the polyurethane.

Silane coupling agents chemically connect the abrasives particles with the polyurethane binder. Coupling agents useful in the invention are preferably selected from the group consisting of compounds having the general formula $R_nSiX_{(4-n)}$ wherein:

R is independently selected from the group consisting of amine-functional non-hydrolyzable organic radicals having from 1 to about 10 carbon atoms, acrylate-functional non-hydrolyzable organic radicals having from 1 to about 10 carbon atoms, and vinyl-functional non-hydrolyzable organic radicals having from 1 to about 10 carbon atoms;

X is a hydrolyzable group; and n is an integer ranging from 1 to 3.

Particularly preferred are amine-functional silane coupling agents.

The ability of the bonded abrasive articles of the invention to be operated at high speeds and/or high pressures with significantly reduced glazing and smearing while exhibiting improved cutting performance is thought to be attributable to a number of factors, such as the glass transition temperature of the cured polyurethane resin, the temperature range over which the complete glass transition occurs (hereinafter referred to as the glass transition temperature range), and the composition of the coupling agent used. For polyurethane resins to be useful as binders in high speed and/or pressure grinding operations without undesirable glazing or smearing, Moren (U.S. Pat. No. 4,933,373) discovered that the binder material preferably has a glass transition temperature greater than about 10° C. and a glass transition temperature range greater than about 70° C. However, to increase the cutting efficiency, the present inventor has determined that bonded abrasives employing the Moren binder that also contain silane coupling agent-coated abrasive particles expectedly outperformed polyurethane resin bonded abrasives not containing silane coupling agents. Further, the inventor herein has determined that bonded abrasives containing cured polyurethane resins employing amino-functional silane coupling agent-coated abrasive particles are more efficient than bonded abrasives containing cured polyurethane resins employing acrylate- or vinyl-functional silane coupling agent-coated abrasive particles.

The bonded abrasive articles of the invention are preferably formed using abrasive particles that have been coated (as purchased or coated after purchasing) with an aminosilane coupling agent. In one particularly preferred embodiment, the abrasive particles are dispersed throughout and adhered within a tough, smear-resistant, elastomeric, crosslinked polyurethane binder such as described in U.S. Pat. No. 4,933,373 (Moren). The binder described in this patent comprises the cured polymerization reaction product of a polymerizable mixture comprising: (a) a low molecular weight, active hydrogen functional monomer having an average active hydrogen functionality ranging from about 2 to 8 and an average molecular weight less than about 400; (b) a high molecular weight, active hydrogen functional diene prepolymer having an average active hydrogen functionality ranging from about 2 to 4 and a weight average molecular weight ranging from about 400 to 25,000; (c) a "polyisocyanate", defined as an isocyanate having an average isocyanate functionality ranging from about 2 to 4; and (d) a crosslinking initiator which induces crosslinking between unsaturated sites on adjacent diene prepolymer residues. The components of the mixture are present in such relative quantities as are necessary to provide the binder matrix with a glass transition temperature greater than about 10° C. and a glass transition temperature range of greater than about 70° C.

Another preferred polyurethane binder useful in the invention comprises a tough, smear-resistant polyurethane urea binder. As used herein the terms "polyurea urethane" and "polyurethane urea" mean polymers having both urethane and urea linkages. For polyurethane ureas, of the total number of urethane and urea linkages, at least 50 percent are urea linkages, more preferably at least 90 percent. For polyurea urethanes, of the total number of urethane and urea linkages, at least 50 percent are urethane linkages, more preferably at least 90 percent. The binder used in this embodiment preferably comprises polyurethane urea polymers having alternating high and low molecular weight segments. The low molecular weight segments of adjacent polyurethane urea chains congregate to form "hard" regions, while the high molecular weight segments congregate to form "soft" regions. The polyurethane urea polymers are formed primarily from the reaction product of a polyfunctional isocyanate and a polyfunctional amine (which lead to urea linkages), and may optionally include chain-extending monomers such as low molecular weight (i.e. less than about 500) alcohols or amines. Preferably, equal reactive equivalents of polyfunctional amine and polyfunctional isocyanate are employed in forming this preferred binder.

The bonded abrasive articles of the invention, when fabricated into wheels and other common shaped objects, display higher rates of workpiece cut and lower rates (or no significant increase) of abrasive wheel loss ("wear") than conventional elastomeric and polyurethane bonded abrasive articles. That is, when the combination of silane coupling agent and polyurethane binder are skillfully chosen to optimize cut, wear either remains unchanged or is actually reduced. Furthermore, the inventive articles can be urged against a workpiece at higher pressures and/or higher surface speeds without undesirable glazing of the article's surface or smearing of the abrasive article on the surface of the workpiece than is typically possible with conventional elastomer bonded abrasive wheels. This combination of superior cutting performance and smear-resistance is believed attributable to the elastomeric polyurethane or polyurethane urea binder in combination with the silane coupling agent-coated abrasive particles.

Cured polyurethane resins useful in forming the abrasive articles of the invention may be solid or foamed. Foamed articles are prepared by the inclusion of a foaming agent in the polymerizable mixture which cures to form the cured polyurethane resin.

Abrasive articles made according to the invention can be used in metal, glass and wood stock removal operations. Typically, foamed abrasive articles are more flexible and may be of greater utility in wood-working applications, while solid abrasive articles are more durable and may have greater utility in metal-working applications. However, it should be understood that both the solid and foamed articles may find utility in refining metal, glass and wood surfaces.

Another aspect of the invention is a method of making a bonded abrasive article, the method comprising the steps of:

(a) selecting a polyurethane resin precursor composition comprising a polyurethane resin precursor;

(b) dispersing within the polyurethane resin precursor composition a plurality of abrasive particles having a coating of silane coupling agent thereon to form a slurry; and (c) subjecting the slurry to conditions sufficient to cure the polyurethane resin precursor.

An alternative method of making a bonded abrasive article comprises (a) selecting a polyurethane resin precursor composition comprising a polyurethane resin precursor and silane coupling agent;

(b) dispersing within the polyurethane resin precursor composition a plurality of abrasive particles to form a slurry; and (c) subjecting the slurry to conditions sufficient to cure the polyurethane resin precursor to form a cured polyurethane resin and bond the silane coupling agent to the abrasive particles and the cured polyurethane resin.

Another aspect of the invention is a method of abrading a workpiece with a bonded abrasive article of the invention, the method comprising creating relative movement between the workpiece and the abrasive article while contacting the abrasive article and the workpiece with force sufficient to abrade the workpiece.

Further aspects and advantages of the invention will become apparent from the description of preferred embodiments which follows.

DESCRIPTION OF PREFERRED EMBODIMENTS

Abrasive Particles

Individual abrasive particles (uncoated) may be selected from those commonly used in the abrasive art, however, the abrasive particles (size and composition) will be chosen with the application of the abrasive article in mind. In choosing an appropriate abrasive particle, characteristics such as hardness, compatibility with the intended workpiece, particle size, reactivity with the workpiece, as well as heat conductivity may be considered.

The composition of abrasive particles useful in the invention can be divided into two classes: natural abrasives and manufactured abrasives. Examples of natural abrasives include: diamond, corundum, emery, garnet, buhrstone, chert, quartz, sandstone, chalcedony, flint, quartzite, silica, feldspar, pumice and talc. Examples of manufactured abrasives include: boron carbide, cubic boron nitride, fused aluminum oxide, ceramic aluminum oxide, heat treated aluminum oxide, alumina zirconia, glass, silicon carbide, iron oxides, tantalum carbide, cerium oxide, tin oxide, titanium carbide, synthetic diamond, manganese dioxide, zirconium oxide, and silicon nitride.

The preferred abrasive particles employed in the bonded abrasive articles of the present invention are aluminum oxide ($Al_2O_3$) abrasive particles that have been at least partially coated with an amine-functional silane coupling agent. Uncoated abrasive particles are preferably coated with the coupling agent by mixing the dry abrasive particles with a dilute solution of coupling agent in an appropriate solvent, such as isopropanol or a 1:1 mixture of isopropyl alcohol and water, to form a slurry. The solvent is then driven off by moderate heating and agitation, leaving only the higher boiling temperature component (the silane coupling agent) and the abrasive particles, the coupling agent coated onto the particles. After removal of solvent, the coupling agent should be present at preferably 0.001 to 1.0 weight percent (of the coated abrasive particles), more preferably 0.01 to 0.05 weight percent.

Abrasive particles useful in the invention typically and preferably have a particle size ranging from about 0.1 micrometer to about 1500 micrometers, more preferably ranging from about 0.1 micrometer to about 1300 micrometers. The preferred abrasive particles for wood-working or metal-working applications are silane coupling agent-coated aluminum oxide abrasive particles of grade ranging from about 24 to 400 (average particle size of from 710 micrometers to 38 micrometers). It is well within the skill in the art to select the appropriate abrasive particle size according to the intended use of the resulting article.

Furthermore, the silane coupling agent-coated abrasive particles should be present in an amount sufficient to provide a weight ratio of coated abrasive particles to cured polyurethane resin ranging from about 0.5:1 to 10:1, preferably ranging from about 1.5:1 to 4:1. When the ratio is greater than 4:1, the slurry viscosity may make mixing of the slurry and transfer into molds difficult. When the ratio is less than 1.5:1, smear-resistance of the final article may decrease.

It is preferred that abrasive particles used in the invention have a Moh's hardness of at least 8, more preferably above 9; however, for specific applications, such as buffing, softer particles may be used, such as talc, which has a Moh's hardness of 1.

It is also anticipated that abrasive particles having or adapted to have surface-pendant hydroxyl groups will produce an article with more efficient abrasiveness than abrasives particles not having hydroxyl groups, due to the generally recognized reaction mechanism for silane coupling agents discussed below.

The term "abrasive particle" includes agglomerates of individual abrasive particles. An abrasive agglomerate is formed when a plurality of abrasive particles are bonded together with a binder to form a larger abrasive particle which may have a specific particulate structure. The plurality of particles which form the abrasive agglomerate may comprise more than one type of abrasive particle, and the binder used to bind individual abrasive particles together may be the same as or different from the binder used to bind agglomerates into an abrasive article or to a backing.

Mixtures of abrasive particles, in the coated state, are intended to be within the scope of the invention, and it is within the scope of the invention to use uncoated abrasive particles with coated abrasive particles in the same polyurethane resin.

Silane Coupling Agents

Silane coupling agents useful in the invention have the general formula:

wherein R is a nonhydrolyzable organic radical, preferably with amine functionality, and X is a hydrolyzable group such as alkoxy, acyloxy, amine, or halogen. Other useful functionalities for the non-hydrolyzable R groups are acrylate- and vinyl-functional groups.

Silane coupling agents are preferably subjected to hydrolysis prior to application to abrasive particles. This is easily accomplished by first combining the silane coupling agent with an excess of alcohol/water solution, then adding abrasive particles thereto to form a slurry. The reaction of the silane coupling agent with the surface of the abrasive particles typically proceeds in four steps: hydrolysis of the hydrolyzable groups to form hydroxyl groups; condensation of at least some of the hydroxyl groups to form an oligomer having pendant hydroxyl groups; hydrogen bonding of the oligomer-pendant hydroxyl groups with surface-pendant hydroxyl groups of the abrasive particles; and elimination of water and covalent bond formation between the oligomer-pendant and surface-pendant hydroxyl groups, as shown below in Reactions 1-4 with n=1:

Reactions 1 and 2:

-continued

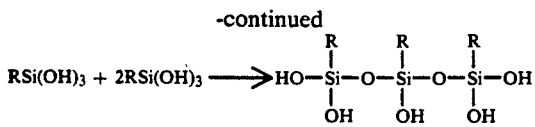

Reaction 3:

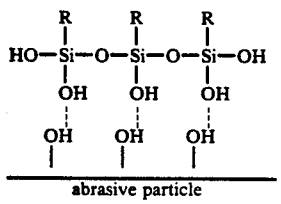

Reaction 4:

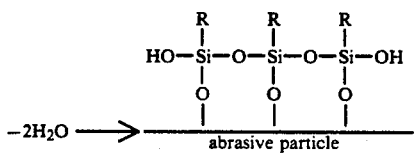

When coating the silane coupling agent onto abrasive particles, one preferred method is to add the solvent/coupling agent mixture to a container containing abrasive particles to form a slurry, agitate the slurry by hand shaking or other means, then dry the slurry by placing the container in an oven at about 100° C. for 1 to 2 hours.

As stated previously, the inventor herein has discovered that aminosilane coupling agent-coated abrasive particles yield bonded abrasive articles which are more efficient than bonded abrasive articles employing abrasive particles coated with other functionalized silane coupling agents. Further, it appears easier to formulate efficient bonded abrasive articles using silane coupling agent-coated abrasive particles than when employing silane coupling agents which are merely mixed with the polyurethane resin, although the latter formulations are considered within the scope of the invention.

Preferred aminosilane coupling agents are monoaminosilanes such as γ-aminopropyltriethoxysilane, and the like, available under the trade name "A-1100" (Union Carbide Corporation). Slightly less effective are the di- and trifunctional aminosilane coupling agents such as N-β(aminoethyl)-γ-aminopropyltrimethoxysilane, and the like, available as "A-1120" (Union Carbide Corporation) and "Z-6020" (Dow Corning Corporation), and the triaminofunctional silanes such as $H_2NCH_2CH_2NHCH_2CH_2NHCH_2CH_2CH_2Si(OCH_3)_3$ and the like, available under the trade designation "A-1130" from Union Carbide Corporation.

Less effective silane coupling agents are methacrylate- and vinyl-functional silane coupling agents such as 3-methacryloxypropyltrimethoxysilane, and the like, available under the trade name "Z-6030" and triacetoxyvinylsilane, available under the trade name "Z-6075", both available from Dow Corning Corporation.

Cured Polyurethane Resins

A. Derived From Diene Prepolymers

The bonded abrasive compositions of the invention may be prepared using a "diene prepolymer" method by the following steps: (a) preparing a solvent-free, liquid, polymerizable mixture comprising a low molecular weight, active hydrogen functional monomer; a high molecular weight, active hydrogen functional diene prepolymer; a polyisocyanate; and a crosslinking initiator in such relative amounts as necessary to provide, upon curing, a polymer having a glass transition temperature greater than about 10° C. and a glass transition temperature range greater than about 70° C., (b) dispersing silane coupling agent-coated abrasive particles throughout this liquid polymerizable mixture, (c) pouring this abrasive particle/liquid polymerizable mixture slurry into a mold, and (d) curing the polymerizable mixture.

Low molecular weight, active hydrogen functional monomers useful in this embodiment should have an average active hydrogen functionality ranging from about 2 to 8, preferably ranging from about 2 to 4, and more preferably ranging from about 2 to 3, and a molecular weight less than about 400, preferably less than 200. The low molecular weight active hydrogen functional monomer functions as a chain-extending monomer, thereby allowing the formulator to adjust the hardness of the cured resin. Generally, as the amount of low molecular weight active hydrogen functional monomer increases, the hardness of the cured resin increases. As used herein, "active hydrogen functionality" refers to the number of hydroxy, amine, carboxyl, and thiol groups present in the molecule.

Low molecular weight monomers useful in the invention may be aliphatic or aromatic. Suitable examples include trimethylolpropane monoallyl ether, ethanolamine, diethanolamine, methylene dianiline, diethyltoluene diamine, 2-methylpentamethylenediamine, paraphenylenediamine, ethylene glycol, 1,2-propylene glycol, 1,3-propylene glycol, 1,4-butylene glycol, 2,3-butylene glycol, 1,4-butenediol, 1,4-butanediol, various hydroxy substitutions of pentanediol, hexanediol and octanediol, trimethylolpropane, and mixtures thereof.

The most preferred low molecular weight monomers have an average active hydrogen functionality of 2 as these do not provide additional crosslinking in the resultant polyurethane network and, therefore, do not reduce the resiliency of the binder. Of these difunctional monomers, the diols are preferred with 1,4-butanediol, in particular, being especially preferred.

When a more highly crosslinked and less resilient bonded abrasive article is desired, low molecular weight monomers having an average active hydrogen functionality greater than 2, such as triols or higher functional polyols, may be present in the low molecular weight monomer component. However, when these triols or higher functional polyols provide more than about 5 percent of the active hydrogen functional sites in the polymerizable mixture, the resultant bonded abrasive articles may display a decrease in abrading efficiency. It is, therefore, generally preferred that no more than about 5 percent of the total active hydrogen functional sites in the polymerizable mixture be provided by low molecular weight monomers having an average active hydrogen functionality greater than 2.

Furthermore, it may be desirable to include low molecular weight diamines in the low molecular weight monomer component in order to introduce urea linkages into the polyurethane network. In such cases the resulting polymer is more aptly described as a "polyurea urethane", meaning that a major portion of the sum of urethane and urea linkages are urethane linkages.

High molecular weight, active hydrogen functional, diene prepolymers useful in the invention preferably have an average active hydrogen functionality ranging from about 2 to about 4, and a weight average molecular weight ranging from about 400 to about 25,000. More preferably, useful diene prepolymers have an average active hydrogen functionality of from about 2 to 3, and a weight average molecular weight ranging from about 1,000 to 5,000. The high molecular weight diene prepolymer functions to provide flexibility and resiliency to the bonded abrasive articles of the invention. Generally, as the molecular weight of the high molecular weight diene prepolymer increases, flexibility of the cured resin increases. Suitable useful examples include hydroxy-, carboxy-, thiol- and amine-functional diene polymers. One preferred active hydrogen functional, high molecular weight diene prepolymer is a hydroxy-terminated polybutadiene having an average active hydrogen functionality between about 2.4 and 2.6 and a weight average molecular weight of about 2,800, which is commercially available from Atochem Inc. under the trade designation "Polybd R-45HT".

Polyisocyanates useful in formulating polyurethanes of this method should have an average isocyanate functionality ranging from about 2 to 4, preferably from about 2 to 2.3, and may be aliphatic, cycloaliphatic, araliphatic, aromatic, heterocyclic or mixtures thereof. The isocyanate groups of the polyisocyanates function to react with the active hydrogen functionalities of the low molecular weight monomer and high molecular weight diene prepolymer. Suitable examples include 1,6-hexamethylene diisocyanate, 1,4-cyclohexane diisocyanate, tolylene diisocyanate, p-phenylene diisocyanate, diphenylmethane diisocyanate, naphthalene-1,5-diisocyanate, and mixtures thereof. The polyisocyanate is preferably present in an amount sufficient to react with all of the active hydrogen functional groups in the polymerizable mixture.

Crosslinking initiators useful in the diene prepolymer method may be any free radical initiator. Preferred crosslinking initiators are the organic peroxides. Suitable examples of organic peroxide initiators include t-butyl peroxyisobutyrate, benzoyl peroxide, p-chlorobenzoyl peroxide, hydroxyheptyl peroxide, cyclohexanone peroxide, di-t-butyl terephthalate, t-butyl peracetate, t-butyl perbenzoate, dicumyl peroxide, t-butyl hydroperoxide, methyl ethyl ketone, di-t-butyl peroxide, p-methane hydroperoxide, pinane hydroperoxide, cumene hydroperoxide, t-butyl peroxy-2-ethyl hexanoate, 1,1-bis-(t-butylperoxy)-3,3,5-trimethyl cyclohexane, 2,5-dimethyl-2,5-di(t-butylperoxy)hexane and 2,5-dimethyl-2,5-dihydroperoxide. The crosslinking initiator should be present in the polymerizable mixture in an amount sufficient to provide from about 0.1 to 10.0 percent, preferably from about 1.0 to 5.0 percent of the total weight of the reactive components of the polymerizable mixture.

In addition to the components specified above, when formulating the polyurethane resin using the diene prepolymer method it may in some instances be preferred that the polymerizable mixture also contain high molecular weight, active hydrogen functional, saturated prepolymer having an average active hydrogen functionality ranging from about 2 to 8, preferably from about 2 to 4, and a weight average molecular weight ranging from about 500 to 10,000, preferably from about 500 to 4,000. High molecular weight, active hydrogen functional, saturated prepolymers function to adjust the distance between crosslinks, and may also function to adjust the glass transition temperature of the polyurethane. Suitable high molecular weight saturated prepolymers include hydroxyl-, carboxyl-, thiol- or amine-terminated polyesters, polyethers, polyacetals, polylactones, polydimethylsiloxanes and mixtures thereof.

The preferred high molecular weight, active hydrogen functional, saturated prepolymers are amine- and hydroxy-terminated polytetramethylene ethers having an average active hydrogen functionality of 2 and a weight average molecular weight of about 1,250 and 2,000, respectively, which are commercially available from Air Products and Chemicals, Inc., under the trade designation "Polamine 1000", and QC Chemicals, Inc. under the trade designation "Polymeg 2000", respectively.

The low molecular weight monomer, high molecular weight diene prepolymer and the high molecular weight saturated prepolymer (when used) are preferably present in the polymerizable mixture in such relative amounts as will produce a polyurethane having a glass transition temperature greater than about 10° C. and a glass transition temperature range greater than about 70° C. Preferably, the low molecular weight monomer is present in an amount sufficient to provide from about 40 to about 90 percent of the total, nonaqueous, active hydrogen functional sites in the polymerizable mixture; and the two high molecular weight prepolymers taken together provide the remaining 10 to 60 percent of the nonaqueous, active hydrogen functional sites. Additionally, it is preferred that the high molecular weight diene prepolymer is present in an amount sufficient to provide about 40 to 80 percent of the total, nonaqueous, active hydrogen functional sites provided by the two prepolymers.

The polymerization reaction which forms the crosslinked polyurethane binder in the diene prepolymer method is preferably conducted in two stages. The first stage, in which a non-crosslinked polyurethane is formed, may be conducted at a broad range of temperatures, usually from about 20° C. to about 125° C. The choice of temperature will, of course, depend upon the rate at which it is desired to conduct the conversion and the physical characteristics of the reactants. Preferably, the urethane forming reaction is carried out at temperatures ranging from about 20° C. to 100° C. At these temperatures, it is frequently desirable, although not essential, to include a catalyst in the polymerizable mixture.

It is generally known that the nucleophilic reactions of isocyanate groups with active hydrogen-containing functional groups may be catalyzed by acids and organic bases. Typical organic bases included triethylamine, pyridine, diethylenetriamine and the like, while strong acids and Lewis acids are also suitable catalysts. The preferred catalysts are organometallic compounds, such as tin derivatives.

Organometallic compounds useful in catalyzing the reaction of isocyanates with macroglycols include, di-n-butyltin dilaurate, as well as carboxylic acid salts of calcium, cobalt, lead, manganese, zinc, and zirconium employed as cocatalysts with tertiary amines, tin compounds and tin-amine combinations. A detailed listing of such catalysts may be found, for example, in U.S. Pat. No. 4,202,957, which is incorporated herein by reference. Certain compounds typically designated as coupling agents in the art may be employed as catalysts, such as the titanate compound known under the trade designation "KR-55", available from Kenrich Petrochemicals, Inc.

Tailoring performance to improve processing properties of uncured polyurethanes and improve abrading efficiency on particular substrates requires the selection of efficient catalysts. Moren discloses use of a combination of a tin compound and an amine which is useful as a catalyst for grinding wheels employed in wood-working applications. Generally, an increase in base strength in tertiary amines increases the catalytic strength, wherein the catalytic activity of tertiary amines is the result of the free electron pair on the nitrogen. The availability of the free electron pair for complexation is more important than its relative base strength. Typical amine catalysts useful in the present invention include triethylamine, and those known under the trade names "Dabco" (Air Products and Chemicals, Inc.), "Niax" (Union Carbide Corporation), "Polycat" (Abbott), and "Thancat" (Jefferson Chemical Company).

The second stage, in which crosslinking of individual polyurethane polymers occurs, likewise can be conducted at a broad range of temperatures, the temperature chosen being dependent upon the desired rate of crosslinking, the decomposition rates of the crosslinking initiator and the thermal degradeability of the polyurethane. When peroxide crosslinking initiators are used, the crosslinking reaction is preferably conducted at temperatures ranging from about 100° C. to 120° C.

Optionally, functional additives such as foaming agents, anti-foaming agents, lubricants, plasticizers, grinding aids, diluents, fillers, reinforcing fibers, coloring agents and process aids may be added to the polymerizable mixture in the diene prepolymer method as desired. Useful foaming agents include water and volatile halogenated hydrocarbon liquids commercially available under the trade designation "FREON". Useful anti-foaming agents include alkali metal aluminosilicates such as that available from Universal Oil Products Company under the trade designation "Molecular Sieve 3A". Useful process aids include titanate dispersing agents which aid the dispersion of the abrasive particles throughout the polymerizable mixture, and silicone surfactants which provide cell structure control and uniformity in foamed articles. Stearates such as butyl stearate are useful as plasticizers, lubricants and viscosity reducers.

B. Polyurethane Ureas

Another class of preferred binders useful in the invention are the polyurethane urea binders described in assignee's copending U.S. application Ser. No. 07/907,223 (Nelson et al.), filed Jul. 1, 1992, entitled "Abrasive Compositions and Articles Incorporating Same." The smear-resistant elastomeric polyurethane urea binders described in the Nelson et al. application are preferably prepared by combining reaction precursors selected from the group consisting of 1) a combination of a first polyfunctional amine having an average functionality of 2 and an equivalent weight of at least about 300, the first polyfunctional amine being capable on polymerization of forming a first high molecular weight segment, and a polyfunctional isocyanate having an average isocyanate functionality of at least 2 and an equivalent weight of less than about 300, the polyfunctional isocyanate being capable on polymerization of forming a first low molecular weight segment; and 2) a combination of a polyfunctional isocyanate prepolymer having a functionality of at least 2 and having an equivalent weight of at least about 300, the polyfunctional isocyanate prepolymer being capable on polymerization of forming a second high molecular weight segment, and a second polyfunctional amine having an average functionality of at least 2 and an equivalent weight of less than about 300, the second polyfunctional amine being capable on polymerization of forming a second low molecular weight segment.

These polyurethane urea binders are particularly well suited in that the resultant bonded abrasive articles have sufficient integrity and abrasive particle retention even at low binder content, are smear-resistant, and exhibit high abrasion efficiency. The high molecular weight segments are derived either from polyfunctional amines or polyfunctional isocyanates having a functionality of about 2 and having an average equivalent weight of at least about 300. The low molecular weight segments are derived either from polyfunctional isocyanates or polyfunctional amines having a functionality of at least about 2 and have an equivalent weight of less than about 250 and preferably having an equivalent weight of at least about 50. If the high molecular weight segments are polyfunctional amines, the low molecular weight segments are polyfunctional isocyanates, and vice versa. Preferably, equal equivalents of polyfunctional amines and polyfunctional isocyanates are employed.

Polyurethane urea polymers especially well suited for use in the invention employ high molecular weight polyfunctional amines which are oligomeric aromatic polyamines having the general formula:

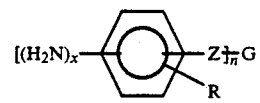

wherein n is an integer from 2 to 4; each x is an integer of 1 or 2; each phenyl nucleus is para-amino, meta-amino, or di-meta-amino substituted; each Z is

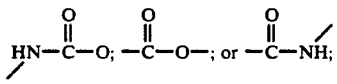

each R is hydrogen or lower alkyl, i.e., 4 carbon atoms or less; and G is an n-valent radical which may be obtained by the removal of hydroxyl or amino groups, respectively, from an n-valent polyol or polyamine having an average equivalent weight ranging from about 300 to about 3,000. Below an equivalent weight of about 300, it may be difficult to achieve the desired flexibility in the cured composition. At equivalent weights above about 3,000, the oligomeric amine may be solid and thus harder to dispense into molds.

The oligomeric aromatic amines are preferably of two classes: aminobenzoic acid esters or amides where Z is

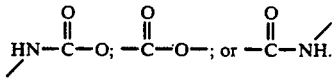

Preferably, the oligomeric polyamine is a substantially difunctional aminobenzoic acid-terminated oligomer with a polytetramethylene ether backbone, having an average equivalent weight of about 300 to 2,000, or mixtures thereof.

Preparation of oligomeric aromatic amines useful in the invention is described in detail in U.S. Pat. No. 4,328,322, incorporated herein by reference. Examples of suitable oligomeric aromatic amines are those available under the trade designations "Polamine" 1000 and "Polamine" 650, commercially available from Air Products and Chemicals, Inc.

When employing oligomeric aromatic polyamines as the high molecular weight segment, the low molecular weight segments are polyisocyanates having an average isocyanate functionality ranging from about 2.1 to 4.0, and may be aliphatic, cycloaliphatic, arylaliphatic, aromatic, heterocyclic or mixtures thereof. Preferred polyisocyanates are aromatic polyisocyanates having an average isocyanate functionality of at least about 2.4. The polyisocyanate should be present in an amount sufficient to react with substantially all of the active hydrogen atoms in the polymerizable mixture. Preferably, the ratio of isocyanate groups of the polyisocyanate and the active hydrogen functional groups of the polyfunctional amines should be about 1 to 1.

Where polyurethane urea polymers are made from high molecular weight aromatic polyamines and low molecular weight polyisocyanates, the polyurethane urea polymers may contain minor quantities of low molecular weight segments which comprise low molecular weight, active hydrogen monomers. The low molecular weight, active hydrogen functional monomers should have an average active hydrogen functionality ranging from about 2 to 8, preferably ranging from about 2 to 4, and more preferably ranging from about 2 to 3, and an average equivalent weight less than about 250, preferably less than 200. As stated previously, "active hydrogen functionality" refers to the number of hydroxy, amine, carboxyl and thiol groups present in the molecule. Suitable examples of low molecular weight active hydrogen functional monomers include those described with reference to the diene prepolymer method discussed previously.

The high molecular weight segment of the polyurethane urea polymers are preferably derived from polyfunctional amines or isocyanates which have an average equivalent weight of at least about 300, and more preferably at least about 400. Examples of suitable high molecular weight polyfunctional amines include the above-mentioned aromatic polyamines and bis(3-amino propyl) polytetrahydrofuran. Suitable high molecular weight polyfunctional isocyanates include the polyisocyanate-terminated reaction product of poly(tetramethylene glycol) polymer and an aromatic or aliphatic isocyanate having a functionality of at least 2, or the reaction product of a dihydroxy-terminated polyester, such as poly(hexamethylene adipate), with an aromatic or aliphatic isocyanate having a functionality of at least 2. Preferably, the high molecular weight isocyanate terminated polymer is blocked with blocking agents that react with the isocyanate group, a reaction which is reversed at elevated temperatures to free the isocyanate group, which then can react with an amine group. Examples of suitable polyfunctional blocked isocyanate polymers include those known under the trade designations "Adiprene" BL90, "Adiprene" BL16 and "Adiprene" BL31, commercially available from Uniroyal Chemical Co., Inc.

As stated previously, the low molecular weight segments of the polyurethane urea polymers useful herein are preferably formed from polyfunctional isocyanates or polyfunctional amines having a functionality of at least about 2, an equivalent weight of less than about 250, and preferably an equivalent weight of at least about 50. Examples include aliphatic, cycloaliphatic, arylaliphatic, aromatic, heterocyclic isocyanates or mixtures thereof. The polyfunctional isocyanate preferably has a functionality of at least about 2.4. Suitable low molecular weight polyfunctional isocyanates include those mentioned as suitable in the diene prepolymer method.

Suitable low molecular weight segment polyfunctional amines include aromatic, alkyl-aromatic, or alkyl polyfunctional amines, preferably primary amines; examples include methylene dianiline (MDA), polymeric methylene dianilines having a functionality of 2.1 to 4.0 which include those known under the trade designations "Curithane" 103, commercially available from the Dow Chemical Company, and "MDA-85" from Bayer Corporation. The former has an average amine functionality of about 2.3 and is composed of 65% 4,4'-methylene dianiline, 5% 2,4'-methylene dianiline, and 30% polymeric methylene dianiline. The MDA-85 contains about 85% 4,4'-methylene dianiline and 15% polymeric methylene dianiline and amine functionality of about 2.2. Examples of suitable alkyl amines include 1,5-diamine-2-methyl pentane, and tris(2-aminoethyl) amine.

When employing a polyurethane urea elastomeric polymer prepared from the reaction product of a polyisocyanate terminated prepolymer (high molecular weight segment) and a polyfunctional amine (low molecular weight segment) it is preferred that the polyisocyanate have a functionality of at least 2.0, and preferably 2.0 to 2.5. Further, the polyfunctional amine should have an active hydrogen functionality of at least about 2.1 to 4.0. Suitable polyfunctional isocyanate prepolymers include poly(tetramethylene) glycol polymer reacted with aromatic or cycloaliphatic isocyanates having a functionality of at least 2. Preferably, the isocyanate terminated prepolymer is blocked with blocking agents as previously described. Preferably the bonded abrasive articles of the invention are porous when employing blocked polyfunctional isocyanates so as to facilitate volatilization of the blocking agent.

Optional functional additives referred to previously which may be added to polyurethane binders in the diene prepolymer method may also be utilized in the polyurethane urea binders described herein.

Abrasive Articles

Bonded abrasive articles of the invention may take any of a variety of conventional forms. The preferred articles are in the form of wheels. Grinding wheels are typically in the form of a disc or right cylinder having dimensions which may be very small, e.g., a cylinder height on the order of a few millimeters, or very large, e.g., two meters or more, and a diameter which may be very small, e.g., on the order of a few centimeters, or very large, e.g., one meter or more. Grinding wheels typically have a central opening for support by an appropriate arbor or other mechanical holding means to enable the wheel to be rotated in use. Wheel dimensions, configurations, means of support, and means of rotation are all well known in the art.

Although the advantages of using the silane coupling agents with the above-described polyurethane polymers are particularly applicable to producing improved bonded abrasive articles, it is contemplated that the advantages will also be seen with nonwoven and coated abrasive article. In coated abrasives an uncured binder resin is coated onto a backing, such as paper, polyester film, cloth and the like, and the binder may comprise conventional make and size resins which bond abrasive particles to the backing, or the abrasive particles may be dispersed in an uncured resin which is coated onto a backing in the form of a slurry. In nonwoven abrasives, the binder bonds abrasive particles to the fibers of a lofty, low density open nonwoven fibrous substrate, such as described in U.S. Pat. No. 2,958,593 (Hoover et al.), incorporated by reference herein.

The invention is further illustrated by the following nonlimiting examples wherein all parts and percentages are by weight unless otherwise specified. "CRS" designates cold rolled steel, and "mm" designates millimeters.

EXAMPLES

Examples 1–6 and Comparative Examples A–F
Comparison of Purchased Silane Coupling Agent-Coated Al$_2$O$_3$ with Non-Coated Al$_2$O$_3$ Examples 1–6 and Comparative Examples A–F were bonded abrasive wheels having a thickness of 25 mm, an inside diameter of 32 mm and an outside diameter of 200 mm and designed primarily for metal-working applications. Examples 2–5 and Control Examples A–E were formed using the procedure of U.S Pat. No. 4,933,373, as detailed below for Example 1, with the only changes being in the amount of butyl stearate incorporated therein. The weight percents of the actual components used in each of these wheels are specified in Table 1.

The wheel of Example 1 was prepared by making a polymerizable solvent-free liquid mixture formed by combining, in a batch container, the following ingredients: (a) an amine-terminated polytetramethylene ether (commercially available from Air Products and Chemicals Corporation under the trade designation "Polamine 1000"; (b) a hydroxy terminated polybutadiene having an average active hydrogen functionality between about 2.4 and 2.6 and an average molecular weight of about 2800 (commercially available from Atochem, Inc. under the trade designation "Polybd R-45HT") (high molecular weight diene prepolymer); (c) 1,4-butanediol (low molecular weight monomer); (d) 3,5-diethyltoluene diamine (low molecular weight monomer); (e) t-butyl peroctoate (commercially available from AKZO Chemicals, Inc. under the trade designation "Trigonox 21-OP50", crosslinking initiator); (f) tetra-(2,2-diallyoxymethyl)butyl, di(ditridecyl)phosphito titanate (commercially available from Kenrich Petrochemicals, Inc. under the trade designation "KR-55", a titanate dispersing agent and catalyst); (g) butyl stearate (plasticizer, lubricant, and viscosity reducer); (h) silicone surfactant (commercially available from Union Carbide Corporation under the trade designation "L-562"); and (i) an alkali metal aluminosilicate, available from Universal Oil Products Company under the trade designation "Molecular Sieve 3A" (desiccant and anti-foaming agent). These components were well mixed and then 4,4'-diphenylmethane diisocyanate (commercially available from Dow Chemical Company under the trade designation "Isonate 143L") (polyisocyanate) was added and dispersed throughout the mixture. To this reactive polymerizable mixture was added 80 grade (average particle size of 0.18 mm) aluminum oxide abrasive particles which were dispersed homogeneously throughout. The resulting reactive abrasive particle slurry was then poured into a 50° C. open steel mold so as to completely fill the mold, and the mold was tightly capped to maintain a closed mold during the reaction of the polyurethane system. After 20 minutes the partially cured molded abrasive article was removed from the mold and placed in an oven heated to 110° C. for one hour forty-five minutes. The resultant molded abrasive wheel was 25 mm thick, and had an inside diameter of 32 mm and an outside diameter of 200 mm.

The wheel of Example 6 was made with a polyurea binder matrix. 459.9 grams of "Polamine 1000" polyamine was mixed with 115.4 grams of a polymeric MDI (methylene diisocyanate having an isocyanate equivalent weight of 140 and a functionality of 3.0, commercially available as "PAPI 2020") and 1,783.8 grams of grade 80 aminosilane-treated aluminum oxide abrasive particles. 1710 grams of the composition was transferred to a 20 cm (outside diameter)×2.5 cm (inside diameter)×3.2 cm wide mold and cured for one hour at 121° C. The wheel of Control Example F was identical to that of Example 6 with the exception that the aluminum oxide was not treated with the silane coupling agent.

Examples 1–6 and Control Examples A–F were evaluated for product cut and wheel wear (the amount of material worn from the workpiece and wheel, respectively) when used to abrade metal test panels. The wheels were prepared by first dressing the working surface of the wheel with a diamond tool to remove the urethane surface skin. The remaining resin on the wheel surface was removed by running the wheel one initial test cycle. This exposed the mineral and generated a working surface.

In this test the wheels were first preweighed and then separately mounted on the arbor of a mechanically driven, variable speed lathe. The revolutions per minute of the arbor were adjusted to provide a working surface speed of 1280 surface meters per minute at the outer surface of each revolving wheel tested. A carriage containing a metal test panel (50 mm by 280 mm, 16 ga. 1008 CRS perforated screen, 4 mm diameter, staggered holes, 46% open, stock pattern #401, commercially available from Harrington & King Perforating Company, Inc., Chicago, Ill.) was brought against each rotating wheel tested at a force of 89 Newtons (3,500 Newtons per meter of wheel width). The carriage was oscillated up and down with a stroke length of 140 mm and a stroke speed of 25 mm/s. Contact between each rotating wheel tested and its metal test panel was maintained for 1 minute, after which time the test was stopped and the weight loss of the wheel and the test panel was determined. Table 2 shows the results of this test for Examples 1–6 and Control Examples A–F. Wheel wear was measured as the percentage of the wheel weight worn away per minute. Additionally, the cut and wheel wear data have been standardized by dividing the measured rates of cut and wear by the thickness of the wheel.

To test smear-resistance of the wheels, 6 mm thick wheels having an inside diameter of 13 mm and an outside diameter of 75 mm, prepared with formulations and procedures identical to those used in Examples 4 and 5 and Control Examples D and E, were evaluated for smearing or transfer of materials from the wheel to a test workpiece. The wheels tested were separately mounted on an electrically powered arbor which was rotated at 7,500 revolutions per minute. The rotating wheel was brought into contact against a 60 millimeter×300 millimeter titanium metal plate with a force of 20.0 Newtons (3150 Newtons per meter of wheel width). The titanium plate was mounted on a table that traversed at 25 millimeters per second so that the rotating wheel made a 155 millimeter long path on the metal plate. The amount of material transferred from the wheel to the workpiece was observed and rated according to the scale given in Table 3.

As shown in Table 2, the cut and wear values for the wheels of Examples 1-6 demonstrate that aminosilane-treated aluminum oxide abrasive particles provide flexible wheels having high amounts of cut, low amounts of wheel wear and little smearing or glazing. In contrast, the wheels of Control Examples A-F, having no mineral pretreatment, show substantially less cut and substantially more wear and smearing.

Examples 7-13 and Comparative Examples G-H

Examples 7-13 were also solid abrasive wheels designed primarily for metal-working applications. The wheel of Examples 7-11 were made using the procedure used to make the wheel of Example 1 with the exception that different levels of aminosilane coupling agents were present on the $Al_2O_3$ abrasive particles. Control Example G was identical to that of Examples 7-11, but the $Al_2O_3$ abrasive particles were untreated. The wheels of Examples 12 and 13 were made using the procedure used to make the wheel of Example 1 with the exception that aminosilane coupling agent-coated grade 80 silicon carbide (SiC) abrasive particles were employed. Control Example H was identical to that of Examples 12 and 13, but the SiC abrasive particles were untreated. The compositions are shown in Table 4.

Examples 7-13 and Comparative Examples G and H were evaluated for product cut and wheel wear as previously described. The test results are shown in Table 5. The results for Examples 7-11 indicate that treatment levels as low as 0.005 weight percent aminosilane coupling agent on $Al_2O_3$ abrasive particles are effective in dramatically increasing grinding efficiency (Example 8). Similarly, although less pronounced, the grinding efficiency of bonded abrasive articles employing aminosilane-coated SiC is improved (Examples 12 and 13).

Examples 14-17 and Comparative Example I

Examples 14-17 were prepared using the procedure given for Example 1 with the exception that mono-, di-, and trifunctional aminosilane coupling agents were used. The treatment level was maintained constant at 0.025 weight percent of abrasive particle weight. Control Example I was identical to Examples 14-17 except that the abrasive particles were untreated. The compositions are given in Table 6. These samples were also tested for cut and wear as described above. The results are shown in Table 7.

Table 7 shows that mono-, di, and tri-functional aminosilane coupling agents all exhibit efficiency higher than untreated abrasive particles, and that monofunctional aminosilane coupling agents are presently preferred when employed in polyurethane binder resins.

Examples 18-21 and Comparative Example J

The wheels of Examples 18-20 were prepared using the procedure given for Example 1 with the exception that the $Al_2O_3$ abrasive particles were treated with silane coupling agents of differing chemical functionality. The silane coupling agents were present on the abrasive particles at the 0.025 weight percent level. The wheel of Comparative Example J was identical to wheels of Examples 18-20 with the exception that the abrasive particles were not treated with silane coupling agent. In the wheel of Example 21, the aminosilane coupling agent-coated $Al_2O_3$ abrasive particles were purchased from the manufacturer, Exolon/ESK. The compositions of the wheels are given in Table 8. These wheels were also tested for cut and wear as previously described. The results are shown in Table 9. The data show the relative superiority of the aminofunctional silane when compared to methacrylate-functional and vinyl-functional silanes.

TABLE 1

| Component | Ex. 1 | Ex. 2 | Ex. 3 | Ex. 4 | Ex. 5 | Ex. 6 | Ex. A | Ex. B | Ex. C | Ex. D | Ex. E | Ex. F |
|---|---|---|---|---|---|---|---|---|---|---|---|---|
| Polamine 1000[1] | 2.81 | 2.78 | 2.76 | 2.74 | 2.74 | 19.5 | 2.81 | 2.78 | 2.76 | 2.74 | 2.74 | 19.5 |
| Polybd R-45HT[2] | 9.94 | 9.85 | 9.77 | 9.70 | 9.70 | 0 | 9.94 | 9.85 | 9.77 | 9.70 | 9.70 | 0 |
| PAPI 2020[3] | 0 | 0 | 0 | 0 | 0 | 4.9 | 0 | 0 | 0 | 0 | 0 | 4.9 |
| 1,4-butanediol | 1.41 | 1.40 | 1.39 | 1.38 | 1.38 | 0 | 1.41 | 1.40 | 1.39 | 1.38 | 1.38 | 0 |
| DETDA[4] | 0.21 | 0.21 | 0.21 | 0.20 | 0.20 | 0 | 0.21 | 0.21 | 0.21 | 0.20 | 0.20 | 0 |
| water | 0.01 | 0.01 | 0.01 | 0.01 | 0.01 | 0 | 0.01 | 0.01 | 0.01 | 0.01 | 0.01 | 0 |
| Isonate 143L[5] | 7.28 | 7.22 | 7.16 | 7.11 | 7.11 | 0 | 7.28 | 7.22 | 7.16 | 7.11 | 7.11 | 0 |
| Trigonox 210-OP50[6] | 0.87 | 0.86 | 0.85 | 0.85 | 0.85 | 0 | 0.87 | 0.86 | 0.85 | 0.85 | 0.85 | 0 |
| KR-55[7] | 0.16 | 0.16 | 0.16 | 0.16 | 0.16 | 0 | 0.16 | 0.16 | 0.16 | 0.16 | 0.16 | 0 |
| L-562[8] | 0.22 | 0.21 | 0.21 | 0.21 | 0.21 | 0 | 0.22 | 0.21 | 0.21 | 0.21 | 0.21 | 0 |
| butyl stearate[9] | 0.00 | 0.86 | 1.70 | 1.69 | 1.69 | 0 | 0.00 | 0.86 | 1.70 | 1.69 | 1.69 | 0 |
| molecular sieve 3A[10] | 0.18 | 0.17 | 0.17 | 0.34 | 0.34 | 0 | 0.18 | 0.17 | 0.17 | 0.34 | 0.34 | 0 |
| grade 80 aluminum oxide (no silane)[11] | 0 | 0 | 0 | 0 | 0 | 0 | 76.92 | 76.26 | 75.61 | 75.61 | 75.61 | 75.6 |
| grade 80 aluminum oxide (with silane)[12] | 76.92 | 76.26 | 75.61 | 75.61 | 75.61 | 75.6 | 0 | 0 | 0 | 0 | 0 |

TABLE 1-continued

| Component | Ex. 1 | Ex. 2 | Ex. 3 | Ex. 4 | Ex. 5 | Ex. 6 | Ex. A | Ex. B | Ex. C | Ex. D | Ex. E | Ex. F |
|---|---|---|---|---|---|---|---|---|---|---|---|---|
| Totals | 100.00 | 100.00 | 100.00 | 100.00 | 100.00 | 100.00 | 100.00 | 100.00 | 100.00 | 100.00 | 100.00 | 100.00 |

[1] Available from Air Products and Chemicals, Inc.
[2] Available from Atochem North America, Inc.
[3] Available from Dow Chemical U.S.A.
[4] Available from Ethyl Corporation
[5] Isocyanate available from Dow Chemical Company
[6] Peroxide available from Akzo Chemicals, Inc.
[7] Coupling agent available from Kenrich Petrochemicals, Inc.
[8] Surfactant available from Union Carbide Corporation
[9] Plasticizer and lubricant available from Stepan Company
[10] Dessicant available from Union Carbide Corporation
[11] Abrasive grains available from Minnesota Mining and Manufacturing Company
[12] Amino silane treated abrasive grains available from Exolon-ESK Company

TABLE 2

| Response | Ex. 1 | Ex. 2 | Ex. 3 | Ex. 4 | Ex. 5 | Ex. 6 | Ex. A | Ex. B | Ex. C | Ex. D | Ex. E | Ex. F |
|---|---|---|---|---|---|---|---|---|---|---|---|---|
| cut, grams | 8.1 | 9.5 | 10.5 | 12.0 | 9.1 | 7.9 | 6.3 | 6.5 | 7.4 | 7.0 | 6.1 | 7.0 |
| wear, % | 0.4 | 0.7 | 1.5 | 2.4 | 0.8 | 0.4 | 1.0 | 1.4 | 2.2 | 2.8 | 1.5 | 0.6 |
| efficiency, g/% | 20.8 | 14.0 | 7.0 | 5.1 | 12.1 | 20.1 | 6.3 | 4.6 | 3.3 | 2.5 | 3.8 | 11.1 |
| smear rating[1] | — | — | — | 3, 3, 3 | 3, 3 | — | — | — | — | 5, 5, 5 | 4, 5 | — |

[1] Individual test results separated by commas

TABLE 3

| Rating | Smear Rating Scheme Observation |
|---|---|
| 1 | No transfer |
| 2 | Very slight transfer |
| 5 | Significant and objectionable transfer |
| 8 | Large amounts of transfer |
| 10 | Gross amounts of transfer |

TABLE 4

| Component | Ex. G | Ex. H | Ex. 7 | Ex. 8 | Ex. 9 | Ex. 10 | Ex. 11 | Ex. 12 | Ex. 13 |
|---|---|---|---|---|---|---|---|---|---|
| Polamine 1000[1] | 2.79 | 3.27 | 2.79 | 2.79 | 2.79 | 2.79 | 2.79 | 3.27 | 3.27 |
| Polybd R-45HT[2] | 9.88 | 11.57 | 9.88 | 9.88 | 9.88 | 9.88 | 9.88 | 11.57 | 11.57 |
| PAPI 2020[3] | 0 | 0 | 0 | 0 | 0 | 0 | 0 | 0 | 0 |
| 1,4-butanediol | 1.41 | 1.65 | 1.41 | 1.41 | 1.41 | 1.41 | 1.41 | 1.65 | 1.65 |
| DETDA[4] | 0.21 | 0.24 | 0.21 | 0.21 | 0.21 | 0.21 | 0.21 | 0.24 | 0.24 |
| water | 0.01 | 0.01 | 0.01 | 0.01 | 0.01 | 0.01 | 0.01 | 0.01 | 0.01 |
| Isonate 143L[5] | 7.24 | 8.48 | 7.24 | 7.24 | 7.24 | 7.24 | 7.24 | 8.48 | 8.48 |
| Trigonox 210-OP50[6] | 0.86 | 1.01 | 0.86 | 0.86 | 0.86 | 0.86 | 0.86 | 1.01 | 1.01 |
| KR-55[7] | 0.16 | 0.19 | 0.16 | 0.16 | 0.16 | 0.16 | 0.16 | 0.19 | 0.19 |
| L-562[8] | 0.22 | 0.25 | 0.22 | 0.22 | 0.22 | 0.22 | 0.22 | 0.25 | 0.25 |
| butyl stearate[9] | 1.29 | 1.51 | 1.29 | 1.29 | 1.29 | 1.29 | 1.29 | 1.51 | 1.51 |
| molecular sieve 3A[10] | 0.34 | 0.39 | 0.34 | 0.34 | 0.34 | 0.34 | 0.34 | 0.39 | 0.39 |
| grade 80 aluminum oxide (no silane)[11] | 75.61 | 0 | 0 | 0 | 0 | 0 | 0 | 0 | 0 |
| grade 80 aluminum oxide (with silane) | 0 | 0 | 75.61[12] | 75.61[14] | 75.61[14] | 75.61[14] | 0 | 0 | |
| grade 80 silicon carbide (no silane)[13] | 0 | 71.43 | 0 | 0 | 0 | 0 | 0 | 0 | 0 |
| grade 80 silicon carbide (with silane)[14] | 0 | 0 | 0 | 0 | 0 | 0 | 0 | 71.43 | 71.43 |
| silane[15] | 0 | 0 | 0.025 | 0.005 | 0.025 | 0.125 | 0.625 | 0.031 | 0.155 |
| Totals | 100.00 | 100.00 | 100.00 | 100.00 | 100.00 | 100.00 | 100.00 | 100.00 | 100.00 |

[1] Available from Air Products and Chemicals, Inc.
[2] Available from Atochem North America, Inc.
[3] Available from Dow Chemical U.S.A.
[4] Available from Ethyl Corporation
[5] Isocyanate available from Dow Chemical Company
[6] Peroxide available from Akzo Chemicals, Inc.
[7] Coupling agent available from Kenrich Petrochemicals, Inc.
[8] Surfactant available from Union Carbide Corporation
[9] Plasticizer and lubricant available from Stepan Company
[10] Dessicant available from Union Carbide Corporation
[11] Abrasive grains available from Minnesota Mining and Manufacturing Company
[12] Amino silane treated abrasive grains available from Exolon-ESK Company
[13] Abrasive grains available from Minnesota Mining and Manufacturing Company
[14] Amino silane-coated abrasive grains coated by the inventor
[15] weight percent of abrasive particles

TABLE 5

| Response | Ex. G | Ex. H | Ex. 7 | Ex. 8 | Ex. 9 | Ex. 10 | Ex. 11 | Ex. 12 | Ex. 13 |
|---|---|---|---|---|---|---|---|---|---|
| cut, grams | 8.1 | 9.0 | 15.3 | 15.4 | 15.8 | 15.8 | 13.5 | 11.4 | 10.7 |
| wear, % | 2.8 | 1.6 | 3.1 | 3.4 | 3.7 | 3.5 | 2.7 | 1.9 | 1.6 |

TABLE 5-continued

| Response | Ex. G | Ex. H | Ex. 7 | Ex. 8 | Ex. 9 | Ex. 10 | Ex. 11 | Ex. 12 | Ex. 13 |
| --- | --- | --- | --- | --- | --- | --- | --- | --- | --- |
| Efficiency, g/% | 3.8 | 5.7 | 4.9 | 4.6 | 4.2 | 4.5 | 5.1 | 6.0 | 7.0 |

TABLE 6

| Component | Ex. I | Ex. 14 | Ex. 15 | Ex. 16 | Ex. 17 |
| --- | --- | --- | --- | --- | --- |
| Polamine 1000 | 2.93 | 2.93 | 2.93 | 2.93 | 2.93 |
| Polybd R-45HT | 10.38 | 10.38 | 10.38 | 10.38 | 10.38 |
| 1,4-butanediol | 1.48 | 1.48 | 1.48 | 1.48 | 1.48 |
| DETDA | 0.22 | 0.22 | 0.22 | 0.22 | 0.22 |
| water | 0.01 | 0.01 | 0.01 | 0.01 | 0.01 |
| Isonate 143L | 7.61 | 7.61 | 7.61 | 7.61 | 7.61 |
| Trigonox 21-OP50 | 0.91 | 0.91 | 0.91 | 0.91 | 0.91 |
| KR-55 | 0.17 | 0.17 | 0.17 | 0.17 | 0.17 |
| L-562 | 0.23 | 0.23 | 0.23 | 0.23 | 0.23 |
| butyl stearate | 1.36 | 1.36 | 1.36 | 1.36 | 1.36 |
| molecular sieve 3A | 0.35 | 0.35 | 0.35 | 0.35 | 0.35 |
| grade 80 aluminum oxide (no silane) | 74.36 | 0.0 | 0.0 | 0.0 | 0.0 |
| grade 80 aluminum oxide (with silane) | 0.0 | 74.36 | 74.36 | 74.36 | 74.36 |
| Totals | 100 | 100 | 100 | 100 | 100 |
| No. of amine groups in silane | n/a | 1 | 1 | 2 | 3 |

TABLE 7

| Response | Ex. I | Ex. 14 | Ex. 15 | Ex. 16 | Ex. 17 |
| --- | --- | --- | --- | --- | --- |
| Cut, grams | 8.7 | 13.2 | 14.1 | 12.7 | 13.2 |
| Wear, % | 2.9 | 2.2 | 2.8 | 2.6 | 2.7 |
| Efficiency, g/% | 3.0 | 5.9 | 5.0 | 4.9 | 4.8 |

TABLE 8

| Component | Ex. J | Ex. 18 | Ex. 19 | Ex. 20 | Ex. 21 |
| --- | --- | --- | --- | --- | --- |
| Polamine 1000 | 2.79 | 2.79 | 2.79 | 2.79 | 2.79 |
| Polybd R-45HT | 9.88 | 9.88 | 9.88 | 9.88 | 9.88 |
| 1,4-butanediol | 1.41 | 1.41 | 1.41 | 1.41 | 1.41 |
| DETDA | 0.21 | 0.21 | 0.21 | 0.21 | 0.21 |
| water | 0.01 | 0.01 | 0.01 | 0.01 | 0.01 |
| Isonate 143L | 7.24 | 7.24 | 7.24 | 7.24 | 7.24 |
| Trigonox 21-OP50 | 0.86 | 0.86 | 0.86 | 0.86 | 0.86 |
| KR-55 | 0.16 | 0.16 | 0.16 | 0.16 | 0.16 |
| L-562 | 0.22 | 0.22 | 0.22 | 0.22 | 0.22 |
| butyl stearate | 1.29 | 1.29 | 1.29 | 1.29 | 1.29 |
| molecular sieve 3A | 0.34 | 0.34 | 0.34 | 0.34 | 0.34 |
| grade 80 aluminum oxide (no silane) | 75.61 | 0.0 | 0.0 | 0.0 | 0.0 |
| grade 80 aluminum oxide (with silane) | 0 | 75.61 | 75.61 | 75.61 | 75.61 |
| Totals | 100 | 100 | 100 | 100 | 100 |
| silane | none | A-1100 | Z-6030 | Z-6075 | Exolon/ESK |
| silane functionality[1] | n/a | A | MA | V | A |

[1] A = amine
MA = methacrylate
V = vinyl

TABLE 9

| Response | Specimen | Ex. J | Ex. 18 | Ex. 19 | Ex. 20 | Ex. 21 |
| --- | --- | --- | --- | --- | --- | --- |
| Cut, grams | A | 6.9 | 11.9 | 10.9 | 8.9 | 12.3 |
|  | B | 6.9 | 12.6 | 9.6 | 8.9 | 10.3 |
| Wear, % | A | 3.2 | 1.8 | 2.1 | 2.0 | 2.2 |
|  | B | 2.8 | 1.9 | 1.5 | 1.6 | 2.3 |
| Efficiency, | A | 2.1 | 6.8 | 5.3 | 4.5 | 5.6 |
| g/% | B | 2.5 | 6.6 | 6.3 | 5.6 | 4.6 |

What is claimed is:

1. A bonded abrasive article comprising a plurality of abrasive particles dispersed and adhered within a cured polyurethane resin, at least a portion of said abrasive particles adhered within said cured polyurethane resin by a silane coupling agent.

2. Article in accordance with claim 1 wherein said silane coupling agents are selected from the group consisting of compounds having the general formula $R_nSIX_{(4-n)}$ wherein:

R is independently selected from the group consisting of amine-functional non-hydrolyzable organic radicals having from 1 to about 10 carbon atoms, acrylate-functional non-hydrolyzable organic radicals having from 1 to about 10 carbon atoms, and vinyl-functional non-hydrolyzable organic radicals having from 1 to about 10 carbon atoms;

X is a hydrolyzable group; and n is an integer ranging from 1 to 3.

3. Article in accordance with claim 2 wherein R is an amine functional non-hydrolyzable organic radical having from 1 to about 10 carbon atoms.

4. Article in accordance with claim 2 wherein n=1.

5. Article in accordance with claim 2 wherein X is a hydrolyzable group selected from the group consisting of alkoxy, acyloxy, amine, and halogens.

6. Article in accordance with claim 1 wherein said coupling agent is γ-aminopropyltriethoxysilane.

7. Article in accordance with claim 1 wherein said coupling agent is N-β(aminoethyl)-γ-aminopropyltrimethoxysilane).

8. Article in accordance with claim 2 wherein R is an acrylate-functional non-hydrolyzable organic radical having from about 1 to 10 carbon atoms.

9. Article in accordance with claim 2 wherein R is a vinyl-functional non-hydrolyzable organic radical having from 1 to 10 carbon atoms.

10. Bonded abrasive composition in accordance with claim 1 wherein said cured polyurethane resin has a glass transition temperature greater than about 10° C. and a glass transition temperature range greater than about 70° C.

11. Article in accordance with claim 1 wherein said cured polyurethane resin has a number of urethane linkages and a number of urea linkages, wherein the number of urea linkages is at least 50% of a sum of the number of urethane linkages and the number of urea linkages.

12. Article in accordance with claim 11 wherein said number of urea linkages is at least 90% of said sum.

13. A method of making a bonded abrasive article, the method comprising the steps of:

(a) selecting a polyurethane resin precursor composition comprising a polyurethane resin precursor;

(b) dispersing within said polyurethane resin precursor composition a plurality of abrasive particles having a coating thereon of a silane coupling agent to form a slurry; and (c) subjecting the slurry to conditions sufficient to cure the polyurethane resin precursor.

14. A method of making a bonded abrasive article, the method comprising the steps of:
  (a) selecting a polyurethane resin precursor composition comprising a polyurethane resin precursor and silane coupling agent;
  (b) dispersing within said polyurethane resin precursor composition a plurality of abrasive particles to form a slurry; and
  (c) subjecting the slurry to conditions sufficient to cure the polyurethane resin precursor to form a cured polyurethane resin and bond the silane coupling agent to the abrasive particles and the cured polyurethane resin.

15. A method of abrading a workpiece with a bonded abrasive article, the article comprising a plurality of abrasive particles dispersed and adhered within a cured polyurethane resin, at least a portion of said abrasive particles adhered within said cured polyurethane resin by a silane coupling agent, the method comprising creating relative movement between the workpiece and the abrasive article while contacting the abrasive article and the workpiece with force sufficient to abrade the workpiece.

* * * * *

UNITED STATES PATENT AND TRADEMARK OFFICE
CERTIFICATE OF CORRECTION

PATENT NO. : 5,250,085
DATED : October 5, 1993
INVENTOR(S) : Mevissen

It is certified that error appears in the above-identified patent and that said Letters Patent is hereby corrected as shown below:

Col. 20, Table 4    Grade 80 aluminum oxide (with silane), under Ex. 11, "0" should be --75.61$^{14}$--

Col. 20, Table 4    Grade 80 aluminum oxide (with silane), under Ex. 13, "the blank space" should be --0--

Col. 22, line 22    "R$_n$SIX$_{(4-n)}$" should be --R$_n$SiX$_{(4-n)}$--

Signed and Sealed this

Seventeenth Day of May, 1994

Attest:

BRUCE LEHMAN

*Attesting Officer*    *Commissioner of Patents and Trademarks*